United States Patent
Inston

(10) Patent No.: US 8,211,339 B2
(45) Date of Patent: Jul. 3, 2012

(54) METHOD AND APPARATUS FOR CURING A THERMOSETTING MATERIAL

(75) Inventor: David Graham Inston, Bristol (GB)

(73) Assignee: Airbus Operations Ltd., Bristol (GB)

( * ) Notice: Subject to any disclaimer, the term of this patent is extended or adjusted under 35 U.S.C. 154(b) by 88 days.

(21) Appl. No.: 12/523,666

(22) PCT Filed: Jan. 31, 2008

(86) PCT No.: PCT/GB2008/050062
§ 371 (c)(1),
(2), (4) Date: Jul. 17, 2009

(87) PCT Pub. No.: WO2008/096167
PCT Pub. Date: Aug. 14, 2008

(65) Prior Publication Data
US 2009/0309249 A1    Dec. 17, 2009

(30) Foreign Application Priority Data
Feb. 9, 2007 (GB) .................................. 0702601.6

(51) Int. Cl.
*B29C 70/42* (2006.01)
(52) U.S. Cl. ....... 264/40.6; 264/519; 264/234; 264/345; 264/348; 264/552; 425/143
(58) Field of Classification Search ............ 264/40.6, 264/519, 234, 345, 348, 552, 241, 642; 425/143, 425/144
See application file for complete search history.

(56) References Cited

U.S. PATENT DOCUMENTS

| | | | | |
|---|---|---|---|---|
| 2,237,435 A * | 4/1941 | Ille | ................................ | 366/263 |
| 3,532,575 A * | 10/1970 | Nagata et al. | .................. | 156/286 |
| 5,051,226 A | 9/1991 | Brustad et al. | | |
| 5,126,167 A | 6/1992 | Matsuno et al. | | |
| 5,158,720 A | 10/1992 | Levy | | |
| 5,219,498 A | 6/1993 | Keller et al. | | |
| 5,770,155 A | 6/1998 | Dunphy et al. | | |
| 6,506,325 B1 | 1/2003 | Cartwright | | |
| 7,167,773 B2 | 1/2007 | Schneider et al. | | |
| 2004/0116925 A1 | 6/2004 | Gill et al. | | |
| 2005/0248047 A1* | 11/2005 | Gupta | ......................... | 264/40.1 |

FOREIGN PATENT DOCUMENTS

| | | |
|---|---|---|
| EP | 0542508 A1 | 5/1993 |
| GB | 2280516 A | 2/1995 |
| GB | 2372706 A | 9/2002 |
| RU | 2006101229 | 5/2006 |

(Continued)

OTHER PUBLICATIONS

Dr. D.A. Bond, "The Evaluation and Development of the Quickstep Out-of-Autoclave Composites Processing Method," University of Manchester, UK, Apr. 21, 2005, pp. 1-17.

(Continued)

*Primary Examiner* — Joseph Del Sole
*Assistant Examiner* — Timothy Kennedy
(74) *Attorney, Agent, or Firm* — Lowe, Hauptman, Ham & Berner, LLP

(57) ABSTRACT

A method and apparatus for curing a thermosetting material. The method comprises heating the material with a liquid heating medium; measuring an electrical or optical property of the material with a cure sensor; and regulating the temperature of the liquid heating medium in accordance with the measured property of the material.

16 Claims, 5 Drawing Sheets

FOREIGN PATENT DOCUMENTS

| WO | 96/07532 A1 | 3/1996 |
| --- | --- | --- |
| WO | 9719325 A1 | 5/1997 |
| WO | 0046014 A1 | 8/2000 |
| WO | 2004110727 | 12/2004 |
| WO | 2005108034 | 11/2005 |

OTHER PUBLICATIONS

Dielectric Analysis—DEA, Netzsch—Leading Thermal Analysis—Products/Solutions—Dielectric Analysis, http://www.netzsch-thermal-analysis.com/en/products/dea/, Oct. 24, 2006.

Record curing processes—even in process!, Netzsch—Leading Thermal Analysis—Products/Solutions—DEA, http://www.netzsch-thermal-analysis.com/en/products/detail/pid,21.html, Oct. 24, 2006, pp. 1-2.

Quickstop!, Quickstep Technology, http://www.quickstep.com.au/how/quickstop.php, Aug. 29, 2006.

Resin Systems for Use in Fibre-Reinforced Composite Materials, http://www.azom.com/details.asp?ArticleID=986, Aug. 18, 2006, pp. 1-9.

Michelle Leali Costa et al., Characterization of Cure of Carbon/Epoxy Prepreg Used in Aerospace Field, Materials Research, vol. 8, No. 3, 2005, pp. 317-322.

Roger Vodicka, Cure Monitoring Techniques Using Embedded Sensors, Defence Science and Technology Organisation, Sep. 1997.

UK Search Report for GB0702601.6 dated Jun. 19, 2007.

ISR for PCT/GB2008/050062 dated May 27, 2008.

Russian Office Action for Application No. 2009132466/05 mailed Nov. 25, 2011.

* cited by examiner

METHOD AND APPARATUS FOR CURING A THERMOSETTING MATERIAL

RELATED APPLICATIONS

The present application is based on International Application Number PCT/GB2008/050062 filed Jan. 31, 2008, and claims priority from British Application Number 0702601.6 filed Feb. 9, 2007, the disclosures of which are hereby incorporated by reference herein in their entirety.

FIELD OF THE INVENTION

The present invention relates to a method and apparatus for curing a thermosetting material. Typically, although not exclusively, the material is a composite material.

BACKGROUND OF THE INVENTION

Traditionally composites have been cured in an autoclave or oven. Autoclaves and ovens are notoriously inefficient and consume much energy and time because of poor heat transfer between gaseous media and solid cure components. Liquid to solid transfer is orders of magnitude better. A method of curing a composite using a liquid heating medium is described in WO 96/07532.

There is commercial benefit in curing quickly and there may be some expected, but as yet unproven, performance benefits as well. However, rapid heating is difficult to achieve in a controlled manner (even using the method described in WO 96/07532) because of the tendency of some thermosetting materials to exotherm—that is to undergo an exothermic reaction which accelerates by positive feedback. A violent exotherm could easily destroy the composite product (and possibly the factory as well).

An element of temperature control is described in WO 96/07532. Temperature sensors are provided within one or both of the liquid-containing pressure chambers so that a heat exchanger can be controlled to maintain the liquid to the desired temperature and time profile. However, such a control system will be unable to react sufficiently quickly to prevent an exotherm, because there will be a time lag between the exotherm and the resulting temperature increase. That is, by the time the temperature increase is detected, it will be too late to prevent the exotherm. Also, the temperature sensors in WO 96/07532 will be unable to accurately detect the degree of cure to enable a controlled increase in temperature towards the end of the curing process.

SUMMARY OF THE INVENTION

A first aspect of the invention provides a method of curing a thermosetting material, the method comprising:
  heating the material with a liquid heating medium;
  measuring an electrical or optical property of the material with a cure sensor; and
  regulating the temperature of the liquid heating medium in accordance with the measured property of the material.

A second aspect of the invention provides apparatus for curing a thermosetting material, the apparatus comprising:
  a cure sensor for measuring an electrical or optical property of the material; and
  a controller coupled to the cure sensor and configured to regulate the temperature of a liquid heating medium in accordance with an output of the cure sensor.

The use of an optical or electrical sensor provides a direct measurement of the chemical changes taking place in the material, with less time lag than a temperature measurement.

Also the output of the optical or electrical sensor can provide an indication of the degree of cure, as well as the rate of change of the degree of cure (i.e. the rate of cure). Therefore the temperature of the liquid heating medium may be regulated in response to a change in the degree of cure, the rate of cure, and/or a higher order differential of the degree of cure.

The temperature of the liquid heating medium may be cooled or heated in the regulation step. In the case of cooling, this can be used to partially quench the curing reaction to prevent an exotherm from developing. In the case of heating, this can be used to accelerate the curing process when the curing process is well developed (and hence there is a lower risk of exotherm).

The output of the cure sensor may provide an indication of an electrical property such as capacitance, conductance, dielectric constant or dielectric loss tangent. In the case of a dielectric measurement, a sensor such as the Netsch™ DEA 230 Epsilon Series may be used.

A problem with electrical measurements is that they are subject to electrical interference and need to be shielded. Therefore in an alternative embodiment the sensor measures an optical property of the material. As well as not suffering from the problem of electrical interference, it is believed that optical properties are more directly indicative of chemical changes occurring in the material.

The optical property may be for example fluorescence in the UV/Visible region, refractive index, or an infrared property. Preferably the cure sensor transmits radiation into the material and measures an optical reflectance property of the material.

The measurement of an infrared property (that is, an optical property of the material at a wavelength between 700 nm and 1 mm) is most preferred as it is believed to be most directly indicative of chemical changes occurring in the material.

Typically the sensor is in physical contact with the material: either embedded within the material or butting against its edge.

The method may be applied to a single-component material, but preferably the thermosetting material comprises a matrix phase of a composite material. Most typically the composite material comprises a fibre-reinforced composite material, where the fibre may be for example carbon-fibre or glass-fibre.

Typically the thermosetting material comprises an epoxy resin. In this case, the cure sensor typically measures the progression of an amine reaction of the epoxy resin.

The liquid heating medium may comprise water, but in order to reach a sufficiently high temperature an inert organic liquid such as glycol is preferred. Alternatively a pseudo-liquid may be used, such as glass ballotini beads or a fluidized bed as described in U.S. Pat. No. 5,051,226. Therefore it will be appreciated that the term "liquid" is used herein to encompass such pseudo-liquids.

The material may be located between a mould surface and a backing surface, each surface forming a wall of a respective pressure chamber, as shown for example in WO 96/07532. In this case, the liquid must be pressurised to compress the material. However, more preferably the material is compressed by evacuating a cavity between the material and a vacuum bag. Preferably the material is immersed in the liquid in a tank, and the liquid physically contacts the vacuum bag.

Preferably the temperature of the liquid heating medium is regulated by mixing it with a liquid at a different temperature.

The mixing may take place either in a tank in which the material is immersed in the liquid, or upstream of the tank. This can be contrasted with the process described in FIG. 3 of WO 96/07352, in which liquid in the pressure chamber is displaced by a liquid at another temperature without mixing.

Typically the method further comprises agitating the liquid, for instance using rotating or reciprocating agitators. This achieves a more uniform transfer of heat to and/or from the material, and better mixing of the liquid.

Typically the apparatus further comprises one or more hot liquid retaining tanks coupled to a curing tank; and one or more cold liquid retaining tanks coupled to the curing tank. The tanks can then be operated in sequence to regulate the temperature. Preferably the hot liquid retaining tanks are coupled to the curing tank via one or more hot liquid inlet ports; and the cold liquid retaining tanks are coupled to the curing tank via one or more cold liquid inlet ports. This removes the need for complex mixing valves as shown in FIG. 3 of WO 96/07352.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
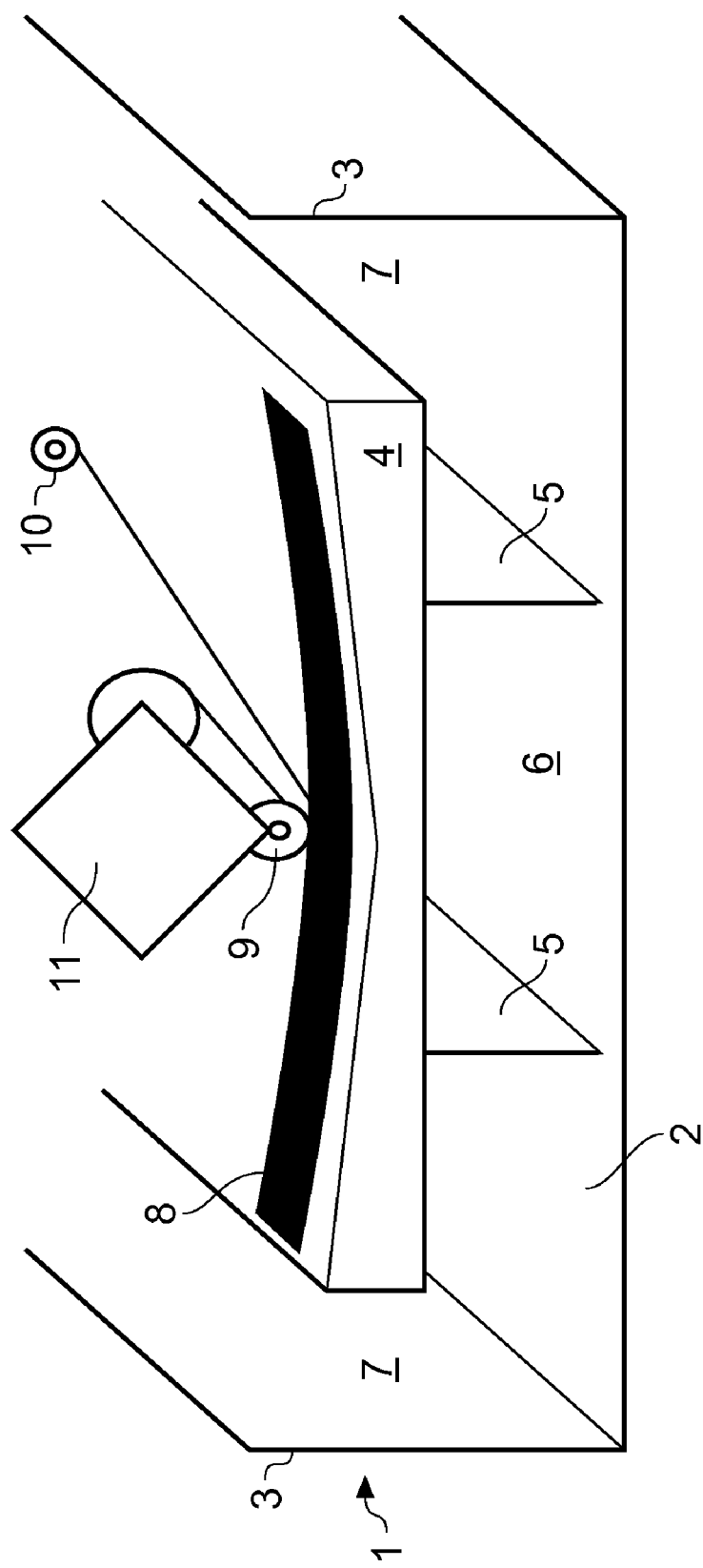
FIG. 1 is a schematic isometric view of a curing tank.

A curing tank 1 shown in FIG. 1 comprises a base 2, a pair of side walls 3 and a pair of end walls (not shown). In the case where the tank is used to cure an aircraft wing skin, the tank may be 35 m long by 5 wide.

A mould tool 4 is mounted on a pair of supports 5, with a gap 6 between the supports. Gaps 7 are also provided between the sides of the mould tool 4 and the side walls 3. The mould tool 4 may be permanently or semi-permanently fixed in place in the tank.

A composite component 8 is shown in FIG. 1, in the process of being laid onto the mould tool 4. The component 8 comprises a series of layers of uni-axial carbon-fibres, pre-impregnated with a thermosetting epoxy resin (conventionally known as "prepregs"). The prepregs are laid with their fibre directions at different angles, as required to give desired structural characteristics to the component. Each prepreg is laid by an Advanced Automatic Tape Laying (ATL) machine roller 9, and may be augmented by an Ultrasonic Consolidation (UTL) unit 11. Prepregs are fed to the ATL roller 9 from a creel 10.

Figure 2:
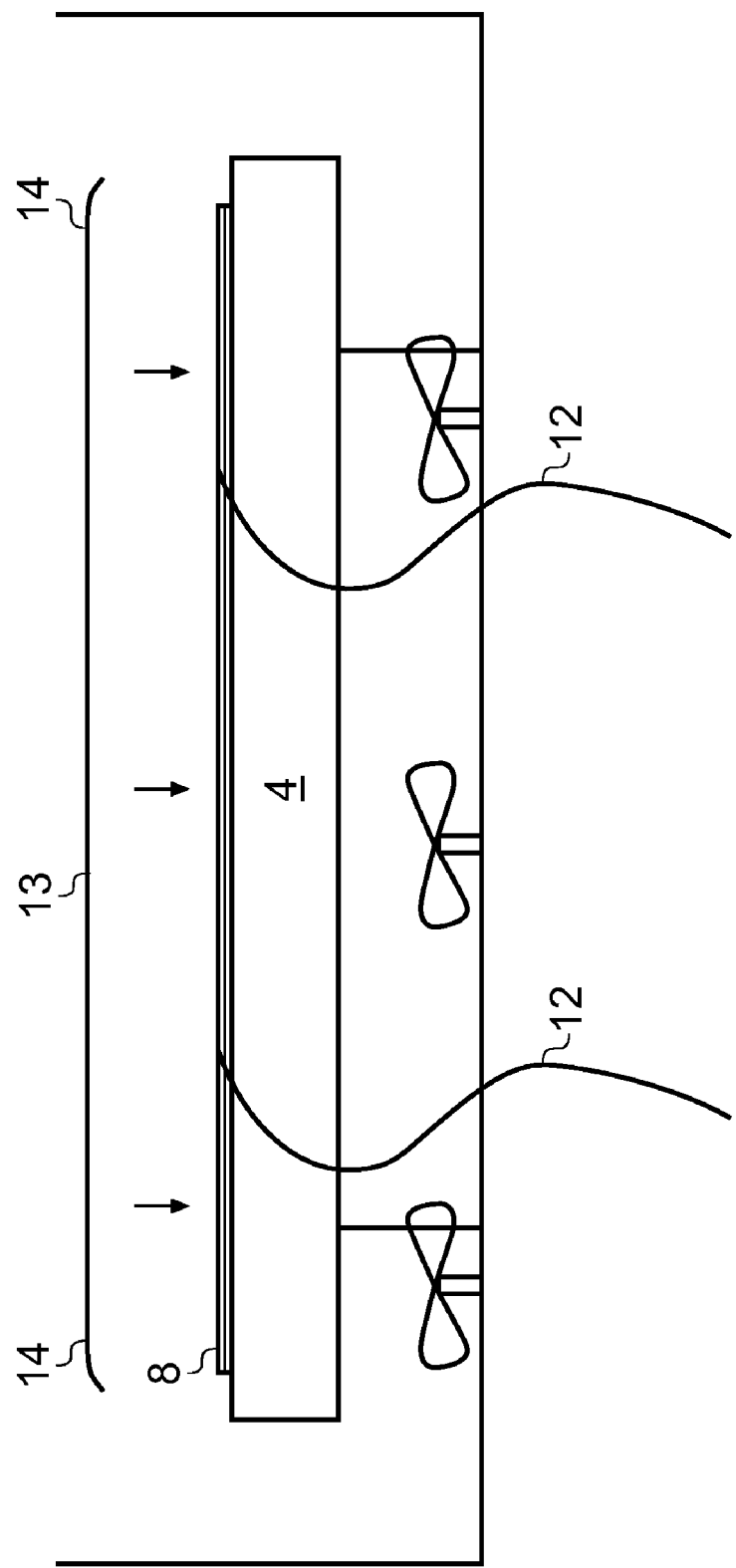
FIG. 2 is a schematic sectional view of the curing tank.

Referring to FIG. 2: once the component 8 has been laid up, a breather layer (not shown) and a flexible CAPRON™ vacuum bag 13 are laid onto the component and sealed against the mould tool 4 by seals 14.

One or more cure sensors 12 is embedded in the component at desired locations during the lay-up process.

Figure 3:
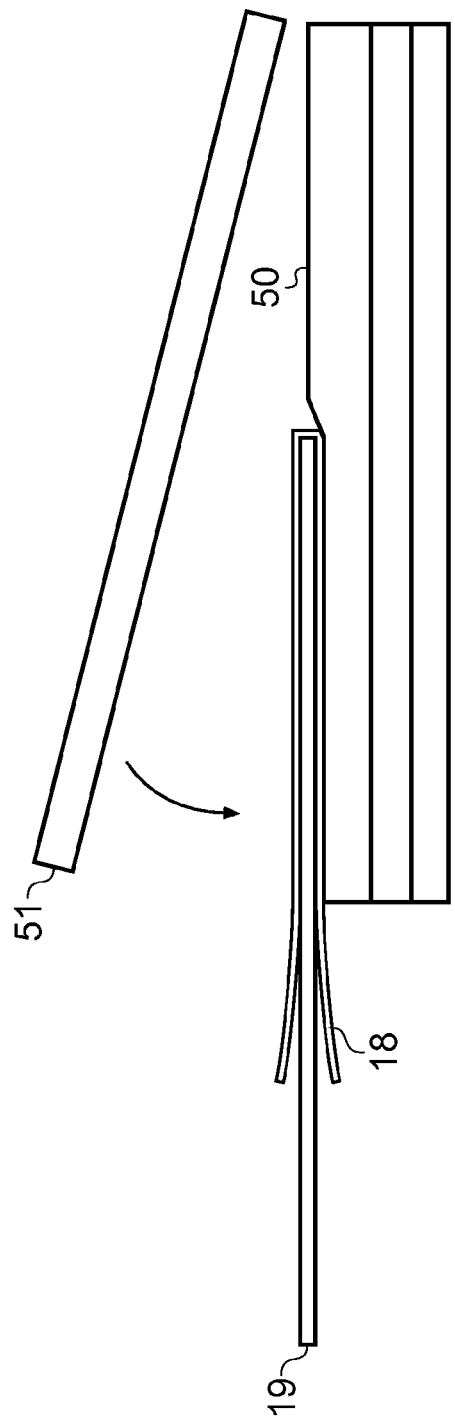
FIG. 3 is a cross-sectional view of a dielectric cure sensor being embedded in a prepreg lay-up.
Figure 4:
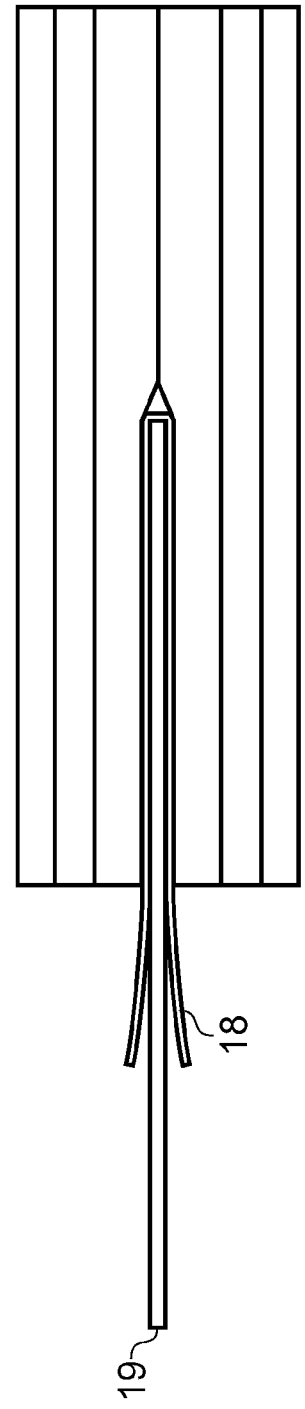
FIG. 4 is a cross-sectional view of the cure sensor embedded in the lay-up.

A method of embedding one of the sensors in the component 8 is shown in detail in FIGS. 3 and 4. FIG. 3 shows a stack of three prepregs including an upper prepreg 50. The cure sensor is laid on top of the prepreg 50 before the next prepreg 51 is laid, leaving the cure sensor embedded between the prepregs as shown in FIG. 4.

Figure 5:
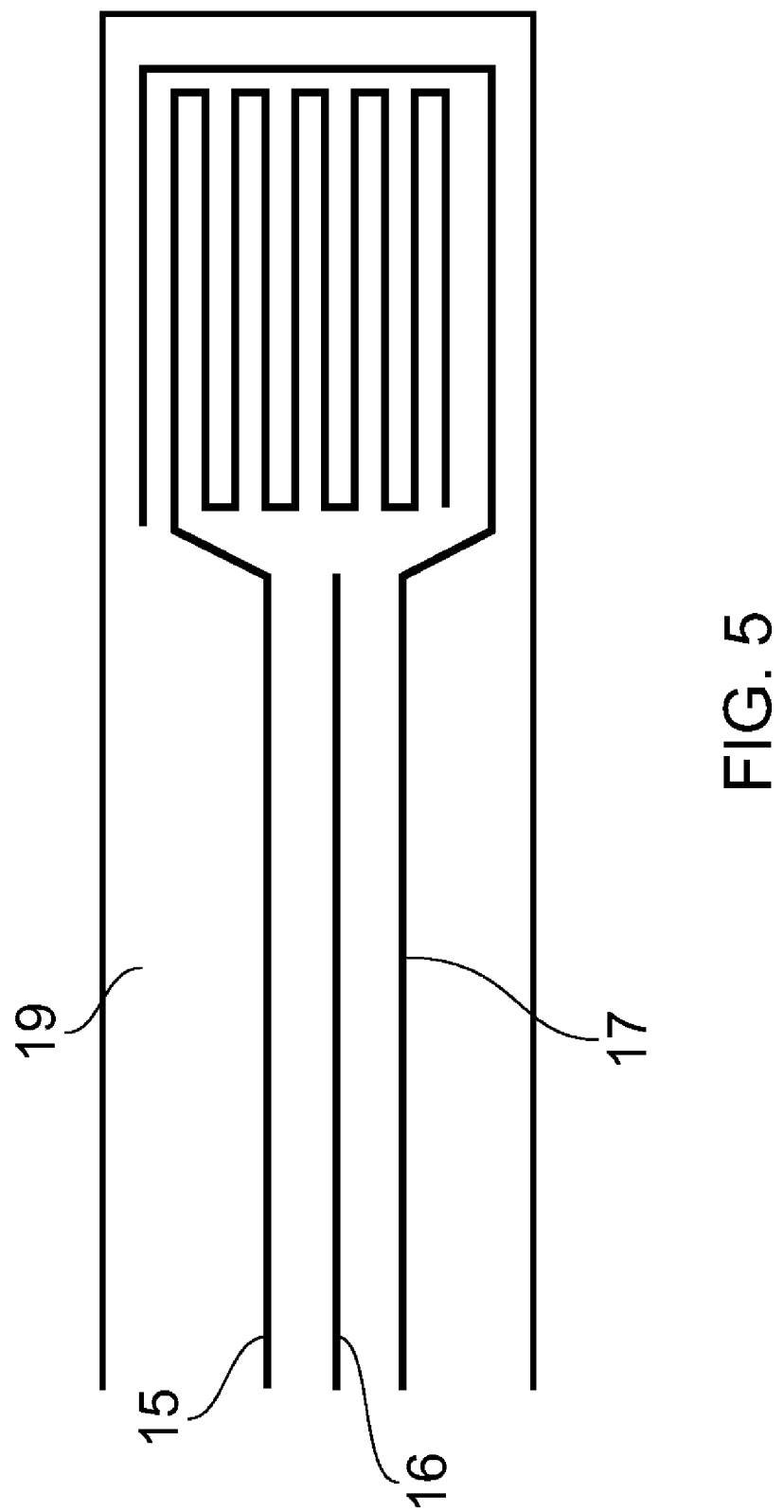
FIG. 5 is a plan view of the dielectric cure sensor.

The cure sensors 12 may be optical fibre cure sensors, or dielectric cure sensors. In the example shown in FIGS. 3 and 4, the cure sensor is a dielectric sensor. FIG. 5 is a plan view of the dielectric cure sensor. It comprises a positive electrode 15, a negative electrode 17 and a reference electrode 16, printed on a flexible polyimide ribbon 19. The embedded end of the ribbon 19 is encased in a glass-fibre fabric sock 18 shown in FIGS. 3 and 4. The sock 18 isolates the electrodes from the conductive carbon-fibre component of the composite, but permits resin to flow into contact with the electrodes. The electrodes 15-17 are connected to a feedback control system 36 shown in FIG. 6, which measures the capacitance between them. This capacitance is related to the dielectric constant of the resin, which in turn is indicative of the progress of the cure reaction.

In the case where the cure sensor 12 is an optical fibre cure sensor, no sock 18 is required. In this case the sensor comprises an optical fibre which is sandwiched between a pair of prepregs. As the prepregs are heated, the resin flows to form a bead engaging the distal end of the optical fibre. Radiation emitted by the fibre is reflected back into the fibre by the resin bead, and then transmitted by the fibre to the feedback control system 36. The system 36 can then analyze a wavelength (or ranges of wavelength) of the reflected radiation to measure the progress of the cure reaction. For instance the system 36 may analyze the amplitude of one or more amine peaks in the infra-red spectrum.

In a further variant (not shown) a dielectric cure sensor may be used which has electrodes embedded in the mold tool 4, lying flush with the mold surface so that they abut the outer surface of the component.

Figure 6:
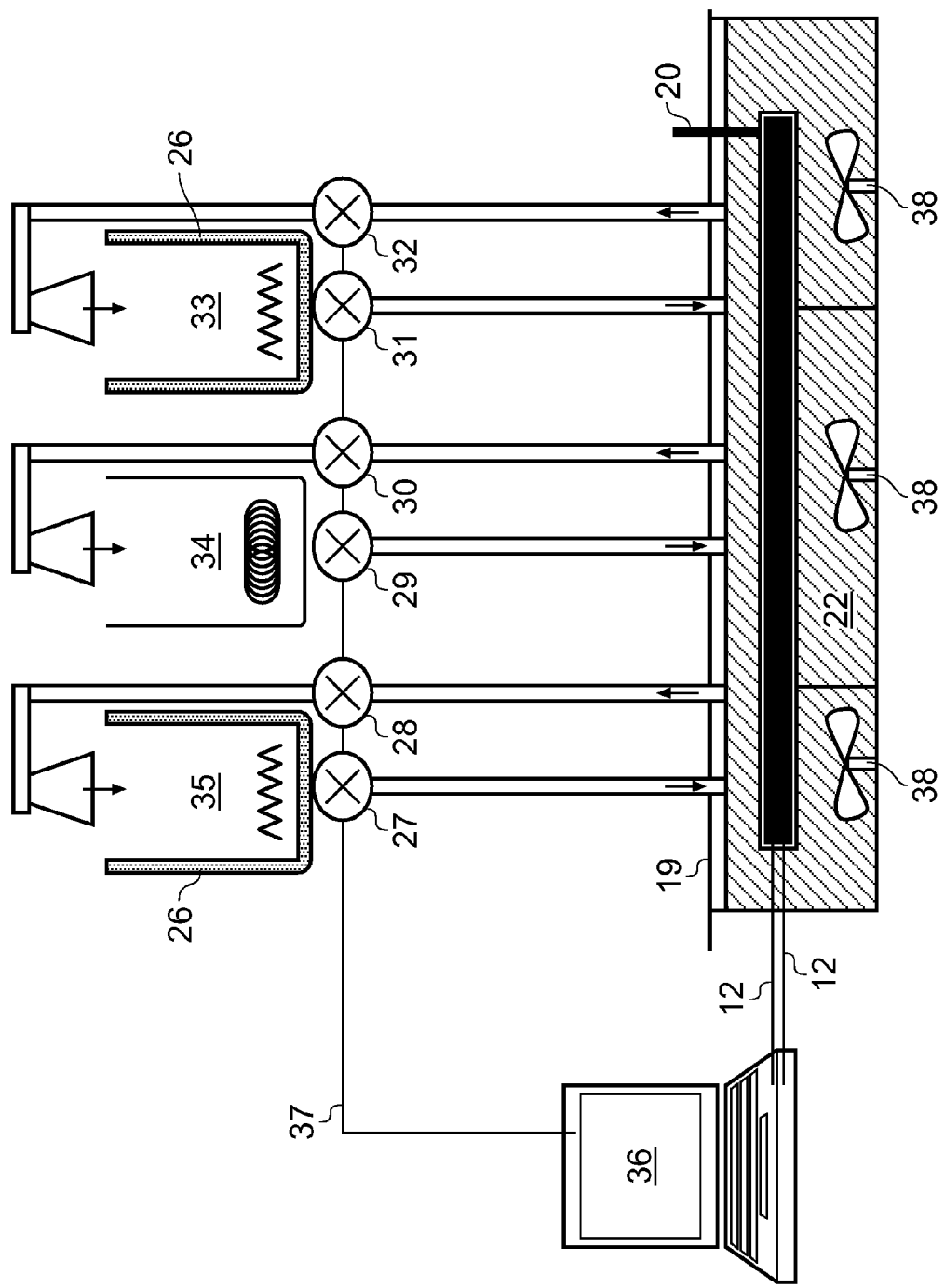
FIG. 6 is a schematic sectional view of the complete system.

Referring to FIG. 6, a vacuum line 20 is coupled through a port in the bag 13 and evacuates the envelope between the bag and the tool 4 to compress the component.

A lid 19 is lowered onto the tank. Three retainer tanks 33-35 are coupled to the curing tank 1 via respective inlet/outlet ports (not labelled) in the lid 19. The flow through the inlet/outlet ports is controlled by pumps 27-32. The tanks 33 and 35 are hot liquid tanks and the tank 34 is a cold liquid tank. Therefore the hot tanks 33,35 contain heating elements, and have thermally insulated walls 26. The cold tank 34 contains a cooling element, and is not thermally insulated. Initially (when the curing tank 1 is empty) the tanks 33-35 are all filled with glycol, with the temperature of the glycol in the hot tanks 33,35 being of the order of 190° C. and the glycol in the cold tank 34 being at room temperature.

A feedback control system 36 controls the cure process by receiving output from the cure sensors 12, and controlling the pumps 27-32 via a control line 37. In FIG. 6 the system 36 is illustrated as a single computer with a keyboard and display input device, although the various functions of the system 36 may be implemented by separate hardware units if required.

The curing process proceeds as follows.

1. The computer 36 operates the pumps 27,31 and hot glycol 22 is pumped into the curing tank 1 from the hot tanks 33,35. This cause the component to be rapidly heated towards its cure temperature of 180° C.
2. The degree and rate of cure is monitored by the computer 36 based on the output of cure sensors 12. The rate of cure is related to the risk of exotherm.
3. If the rate of cure exceeds a preset threshold, then an exotherm may be about to occur. To quench the exotherm, the computer 36 operates the pump 29 to introduce cold glycol into the curing tank 1. The cold gycol is mixed thoroughly with the hot glycol by agitating the liquid in the tank with rotating fans 38. Optionally the pumps 28, 32 may also be operated to return hot glycol into the hot retainer tanks 33,35.

4. As the cure reaction proceeds, the risk of exotherm decreases. Therefore the computer 36 progressively adjusts the pumps to introduce a greater proportion of hot glycol into the tank as the cure progresses, curing the composite faster and hence more efficiently. As a result the ramp up to temperature is not necessarily linear.

5. After the cure is complete, the component is cooled by fully emptying the cold retainer tank 34 to progressively introduce more cold glycol into the tank. In order to avoid thermal stresses being locked in to the component, the cooling process is carefully controlled by ramping the temperature down. Again, this ramp down does not have to be linear. During the cool down step, the hot glycol is pumped into the retainer tanks 33, 35 and progressively replaced by cold glycol. In this way, heat energy is retained in the system and not thrown away.

6. The curing tank 1 is then emptied, returning all of the glycol to the retainer tanks. The glycol in the retainer tanks 33-35 will then be relatively hot (close to 180° C.), so before the next cure cycle the cooling element must be operated to cool the glycol in the cold tank 34 down towards room temperature. Alternatively, if there is sufficient time until the next cure cycle, then the glycol in the cold tank 34 can be left to cool unassisted (in which case the cooling element may not be required). The heating elements in the hot tanks 33,35 are operated to elevate the temperature to 190° C. before the next cure cycle.

7. Next the component is washed (glycol is water soluble) and dried before the vacuum bag 13 is removed to reveal the finished composite part.

There is inertia (time delay) between the observation of a chemical event, as recorded by the optical or electric cure sensor 12, and a temperature rise in the component 8. This gives prior warning of the coming exotherm and enables more effective control feedback.

Another key point is that the system uses the cure reaction to positive advantage by using the glycol to recycle the energy released by the cure reaction.

Although the invention has been described above with reference to one or more preferred embodiments, it will be appreciated that various changes or modifications may be made without departing from the scope of the invention as defined in the appended claims.

The invention claimed is:

1. A method of curing a thermosetting material, the method comprising:
    heating the material with a liquid heating medium from a hot tank;
    measuring an electrical or optical property of the material with a cure sensor;
    regulating the temperature of the liquid heating medium in accordance with the measured property of the material; and
    wherein the temperature of the liquid heating medium is regulated by mixing it with a liquid at a lower temperature from a cold tank different to the hot tank.

2. The method of claim 1 wherein the cure sensor measures a property of the material which is characteristic of the progress of an amine reaction.

3. The method of claim 1 wherein the cure sensor transmits radiation into the material and measures an optical reflectance property of the material.

4. The method of claim 1 wherein the cure sensor measures an optical property of the material at a wavelength greater than 700 nm.

5. The method of claim 1 wherein the cure sensor measures a dielectric property of the material.

6. The method of claim 1 wherein the cure sensor physically contacts the material.

7. The method of claim 1 wherein the thermosetting material comprises a matrix phase of a composite material.

8. The method of claim 1 wherein the thermosetting material comprises an epoxy resin.

9. The method of claim 1 wherein the liquid heating medium comprises glycol.

10. The method of claim 1 further comprising compressing the material by evacuating a cavity between the material and a vacuum bag.

11. The method of claim 10 further comprising contacting the vacuum bag with the liquid heating medium.

12. The method of claim 1 further comprising agitating the liquid heating medium.

13. The method of claim 1 wherein the liquids are mixed in a curing tank in which the material is immersed.

14. The method of claim 13 wherein the liquid at a different temperature is mixed thoroughly with the liquid heating medium by agitating them in the curing tank.

15. The method of claim 14 wherein the liquid at a different temperature is mixed thoroughly with the liquid heating medium by agitating them in the curing tank with rotating fans.

16. The method of claim 1 wherein the temperature of the liquid heating medium is regulated by mixing it with the liquid at a lower temperature to partially quench the curing reaction to prevent an exotherm from developing.

* * * * *